United States Patent
Ko (10) Patent No.: US 9,760,881 B2
(45) Date of Patent: Sep. 12, 2017

(54) PORTABLE E-PAY SYSTEM AND METHOD

(71) Applicant: PARTNER TECH CORP., New Taipei (TW)

(72) Inventor: Chun-Shih Ko, New Taipei (TW)

(73) Assignee: PARTNER TECH CORP, New Taipei (TW)

( * ) Notice: Subject to any disclaimer, the term of this patent is extended or adjusted under 35 U.S.C. 154(b) by 13 days.

(21) Appl. No.: 14/185,241

(22) Filed: Feb. 20, 2014

(65) Prior Publication Data

US 2014/0324608 A1    Oct. 30, 2014

(30) Foreign Application Priority Data

Apr. 30, 2013  (TW) .............................. 102115389 A
Nov. 18, 2013  (CN) ..................... 2013 2 0732227 U (51) Int. Cl.
*G06Q 20/20* (2012.01)
*G06F 21/86* (2013.01)
*G07G 1/00* (2006.01)
*G07G 1/14* (2006.01)
*G06Q 20/32* (2012.01)
*G07F 7/08* (2006.01)
*G06Q 40/00* (2012.01)

(52) U.S. Cl.
CPC .......... *G06Q 20/207* (2013.01); *G06F 21/86* (2013.01); *G06Q 20/204* (2013.01); *G06Q 20/3227* (2013.01); *G06Q 20/3276* (2013.01); *G06Q 40/123* (2013.12); *G07F 7/0886* (2013.01); *G07F 7/0893* (2013.01); *G07G 1/0081* (2013.01); *G07G 1/14* (2013.01)

(58) Field of Classification Search
CPC ... G06Q 20/207; G06Q 20/3227; G06F 21/86
USPC .......... 705/16, 17, 31, 36 T, 19, 39; 235/375
See application file for complete search history.

(56) References Cited

U.S. PATENT DOCUMENTS

| | | | |
|---|---|---|---|
| 5,663,547 A * | 9/1997 | Ziarno ......................... 235/380 |
| 6,078,899 A * | 6/2000 | Francisco et al. .............. 705/19 |
| 7,523,320 B2 * | 4/2009 | Hodder et al. ................ 713/194 |
| 7,616,116 B2 * | 11/2009 | Ehrensvard ........ G08B 13/1445 340/541 |
| 7,908,190 B2 * | 3/2011 | Enenkiel ................ G06Q 40/02 705/31 |
| 2003/0167207 A1 * | 9/2003 | Berardi et al. .................. 705/16 |
| 2006/0253290 A1 * | 11/2006 | Kwon .............................. 705/1 |
| 2010/0079285 A1 * | 4/2010 | Fawcett .............. E05B 73/0005 340/568.1 |
| 2012/0066079 A1 * | 3/2012 | Falzone ................ G06Q 20/20 705/16 |
| 2014/0184415 A1 * | 7/2014 | Edmonds .............. G07F 7/0873 340/686.1 |

(Continued)

Primary Examiner — Vanel Frenel
(74) Attorney, Agent, or Firm — Grossman, Tucker, Perreault & Pfleger, PLLC (57) ABSTRACT

A portable e-pay system and method, comprises a card reading module to charge customers by reading their credit cards. The system further comprises tax information memory used to store transaction information with an electronic signature, and the system also comprises a volatile memory used to store the information of a taxpayer. Furthermore, the portable e-pay system also has a printer, a credit-card authorization module and a credit-card payment request module.

23 Claims, 9 Drawing Sheets

(56) References Cited

U.S. PATENT DOCUMENTS

| | | | |
|---|---|---|---|
| 2014/0214639 A1* | 7/2014 | Roach | G06Q 30/04 705/31 |
| 2014/0240137 A1* | 8/2014 | Neo | G08B 21/185 340/635 |
| 2014/0249944 A1* | 9/2014 | Hicks et al. | 705/17 |

* cited by examiner

PORTABLE E-PAY SYSTEM AND METHOD

CROSS-REFERENCES TO RELATED APPLICATIONS

This application claims priority to Taiwan Patent Application No. 102115389 filed on Apr. 30, 2013, and China Patent Application No. 201320732227.6 filed on Nov. 18, 2013.

BACKGROUND OF THE PRESENT INVENTION

Field of the Present Invention

The present invention is related to a portable e-pay system and method. More specifically, the portable e-pay system and method has a touch panel having tax control function and credit card reconciliation function.

Descriptions of the Related Art

As technology develops, the payment instruments of modern society transaction have changed from traditional paper money and coins to credit currency (e.g., credit cards, debit cards, etc.), and therefore a series of tools are designed to assist merchants to charge customers for payment. However, there is no single Point of Sale (POS) system can assist merchants to deal with filing tax reports or facilitating payment requests and reconciliation now.

There are some prior art POS which can assist merchants to deal with filing tax reports, but those machines usually can not guarantee the accuracy of tax data. Thus, the tax authorities can not confirm the accuracy of those data. In addition, there is no incentive for merchants to record their tax data correctly and file correct tax reports to the tax authorities.

There are some prior art POS with magnetic stripe reader (MSR) and can assist merchants to operate credit card payment procedures. However, under current practice, when merchants proceed credit card operations, they need to capture credit information via MSR and request an authorization code from the Credit Card Center. The Credit Card Center, responding to the requests, transmits an authorization code to the merchants via acquiring bank associating with the merchants, completing the transaction. However, when the merchants request payment from the acquiring bank at the end of each month, the acquiring bank would make a list of the merchants' credit card transaction data in the whole month for merchants to verify. In the meanwhile, since the transaction data stored by merchants and the credit card transaction data provided by acquiring banks do not have the same format and are not in the same order, and since the merchants do not have the correlation between the transaction data and credit card transaction data, the merchants will face difficulties to confirm each credit card transaction data. Therefore, a lot of labor and time are wasted in the verification process.

SUMMARY OF THE PRESENT INVENTION

To attain the above objective, the present invention provides a portable e-pay system and method for the merchants to correctly handle the matter of filing tax reports and request payment from the bank much easier.

The primary objective of the present invention is to provide a portable e-pay system. The system comprises an outer housing, a touch panel, a rechargeable battery and a power connecting socket, wherein the touch panel and the power connecting socket are located on the surface of the outer housing, the rechargeable battery is located within the outer housing, and the rechargeable battery and the power connecting socket are electrical connected, the portable e-pay system further comprises: a card reader module located on the outer housing; an inner housing, having a first inner housing and a second inner housing, wherein the first inner housing and the second inner housing have electrical connection as the first inner housing connects with the second inner housing; a data storage memory located within the outer housing; a tax data memory and a volatile memory both located between the first inner housing and the second inner housing; a taxpayer data storing in the volatile memory, wherein when the portable e-pay system generates a transaction data, the taxpayer data can be used to combine with the transaction data to generate transaction data with electronic signature, and the transaction data with electronic signature is stored in the tax data memory; and a wireless communication module located within the outer housing, for transmitting the transaction data with electronic signature or the transaction data to an external server; wherein when the first inner housing separate with the second inner housing, the taxpayer data is destroyed.

Another objective of the present invention is to provide a portable e-pay system. The system comprises an outer housing, a touch panel, a rechargeable battery and a power connecting socket, wherein the touch panel and the power connecting socket are located on the surface of the outer housing, the rechargeable battery is located within the outer housing, and the rechargeable battery and the power connecting socket are electrical connected, the portable e-pay system further comprises: a credit card reader module located on the outer housing; a data storage memory located within the outer housing; a credit card authorization module, wherein the credit card authorization module can be used to directly or indirectly request an authorization code from a Credit Card Center when the credit card reader module generates a transaction data; a credit card payment request module, wherein the credit card payment request module can be used to request a payment confirming data from an acquiring bank, and the credit card payment request module can save the transaction data and the payment confirming data in a data storage memory after the credit card authorization module receives the authorization code; a wireless communication module located within the outer housing, for transmitting the transaction data, the authorization code or the payment confirming data to an external server; and a printing device located on the outer housing, for printing the transaction data, the authorization code or the payment confirming data.

Yet a further objective of the present invention is to provide a portable e-pay system. The system comprises an outer housing, a touch panel, a rechargeable battery and a power connecting socket, wherein the touch panel and the power connecting socket are located on a surface of the outer housing, the rechargeable battery is located within the outer housing, and the rechargeable battery and the power connecting socket are electrical connected, the portable e-pay system further comprises: a credit card reader module and a printing device located on the outer housing; a data storage memory, a tax data memory and a volatile memory, located within the outer housing; a taxpayer data storing in the volatile memory, wherein the portable e-pay system generates a transaction data before the taxpayer data can be used to encrypt the transaction data in order to generate transaction data with electronic signature, wherein the transaction data with electronic signature is stored in the tax data memory; a credit card payment authorization module, wherein the credit card authorization module can be used to directly or indirectly request an authorization code from a Credit Card Center when the credit card reader module generates a transaction data; a credit card payment request module, wherein the credit card payment request module can be used to request a payment confirming data from an acquiring bank when the credit card authorization module receives the authorization code, and the credit card payment request module can save the transaction data and the payment confirming data into the data storage memory; a wireless communication module located within the outer housing, for transmitting the transaction data, the authorization code, the payment confirming data or the transaction data with electronic signature; and a printing device located on the outer housing, for printing out the transaction data, the authorization code or the payment confirming data.

Yet a further objective of the present invention is to provide an e-pay method. The method comprises: a taxpayer data writing step, wherein a tax payer data is written into a volatile memory of a portable e-pay system; a credit card authorization step, directly or indirectly requesting an authorization code from a Credit Card Center when a credit card reader module of the portable e-pay system obtains a credit data to proceed a transaction and record a transaction data; a credit card payment request step, requesting a payment confirming data from an acquiring bank after the portable e-pay system directly or indirectly receives the authorization code from the Credit Card Center; a taxpayer data storing step, encrypting the transaction data with the taxpayer data in order to generate transaction data with electronic signature, and the transaction data with electronic signature is stored in a tax data memory; a payment request data storing step, saving the transaction data, the authorization code and the payment confirming data into a data storage memory of the portable e-pay system; and a data printing step, printing out the transaction data, the authorization code or the payment confirming data.

Yet a further objective of the present invention is to provide a portable e-pay system, comprising: an outer housing and a lid, wherein the outer housing surrounds the lid, and the outer housing as well as the lid confines an inner space; a touch panel, a rechargeable battery and a power connecting socket, wherein the outer housing surrounds the touch panel and the power connecting socket, and the rechargeable battery is located within the inner space, and the rechargeable battery and the power connecting socket are electrically connected; a card reader module located on the outer housing; a tax element accommodation space is part of the inner space, and the tax element accommodation space is adjacent to the lid; a tax data module connecting device located in the tax element accommodation space, wherein the tax data module connecting device is used for connecting a tax data module; a sealing device comprises a first sealing device and a second sealing device, and the first sealing device and the second sealing device are consecutive, wherein the first sealing device is located on the outer housing and the second sealing device is located on the lid, wherein after the sealing device is established, once the outer housing and the lid separate, the sealing device is destroyed irrecoverable; and a wireless communication module, located within the inner space or on the surface of the outer housing; wherein the tax data module stores a taxpayer data; wherein the portable e-pay system is used to generate a transaction data with the card reader module and the touch panel, the transaction data can be encrypted by the taxpayer data, generating transaction data with electronic signature; wherein the transaction data with electronic signature is stored in the tax data module, and the wireless communication module can transmit the transaction data with electronic signature or the transaction data to an external server.

Yet a further objective of the present invention is to provide a portable e-pay method, the method comprises: a lid opening step, wherein a lid is separated from an outer housing; a tax element setting step, wherein a tax data module is connected with a tax data module connecting device; an outer housing connecting step, wherein the outer housing connects with the lid again; a sealing step, wherein one of the sides where the outer housing connect with the lid is sealed; a transaction item entering step, wherein one or plural transaction items are entered; a paying up step, wherein a card reader module reads a consumer credit information to pay up the one or plural transaction items and generates a transaction data; transaction data with electronic signature generating step, wherein the tax data module electrically signifies the transaction data, generating transaction data with electronic signature; transaction data with electronic signature storing step, wherein the transaction data with electronic signature is stored in the tax data module; and transaction data with electronic signature reading step, wherein the transaction data with electronic signature is read from the tax data module, and is transmitted to an external server through a wireless communication module.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
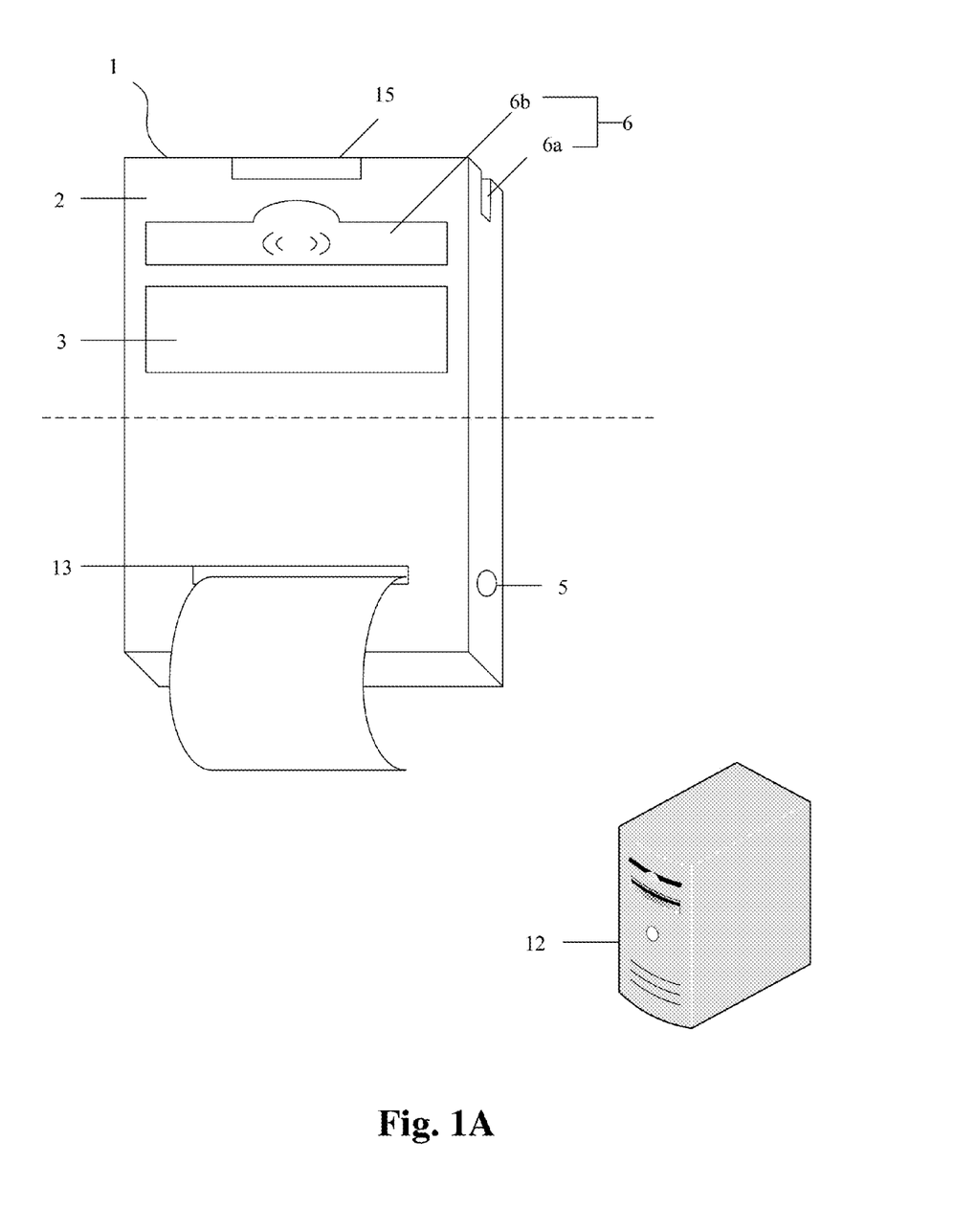
FIG. 1A is the front structure diagram of the portable e-pay system in accordance with the first embodiment of the present invention.

FIG. 1A shows a portable e-pay system 1. FIG. 1A is the first embodiment of the present invention, comprising an outer housing 2, a touch panel 3 located on the surface of outer housing 2, a power connecting socket 5 located on the right side of the surface of the outer housing 2 (but not limited to it). Thus, for a right-handed user operating the electronic equipment, he can use the left hand to hold the present invention and use the right hand to press the touch panel 3 or a group of buttons (not shown). Meanwhile, when the user uses his left hand to hold the portable e-pay system of the present invention, he may use the power connection socket 5 on the right side surface of the outer housing to charge the portable e-pay system 1 without affecting users holding the system 1 with their left hands.

Further, in the first embodiment, the present invention contains a card reader module 6 set on the outer housing 2. The card reader module 6 can be a magnetic stripe reader (MSR) module 6a, used to obtain a magnetic stripe information of a credit card, a debit card and other devices; the card reader module can also be a IC card reader module, used to read the consumer credit card information or other information stored in the IC or other devices. The card reader module 6 can also be a radio frequency identification module or a sensing card module 6b. Therefore, when a card containing a radio frequency device or other antenna coil with a function of receiving and transmitting electric wave, the e-pay system 1 can read the information stored in the card when the card approaches the radio frequency identification module or a sensing card module 6b. What needs to specify is that the portable e-pay system 1 can set up one or plural card reader module 6 so that the system 1 can be used to charge consumers even if consumers want to pay with different kinds of cards. However, the system 1 does not need a single consumer to pay with plural kinds of cards as identity verification.

In a preferred embodiment, the portable e-pay system 1 contains a printing device and a barcode reading module, both located on the outer housing 2. Hence, when customers do shopping, stores can read the barcode on the selected products with the barcode reader module 15, so that waiters or the operators don't need to type in transaction items one by one, and transacting time can be shortened.

Figure 1B:
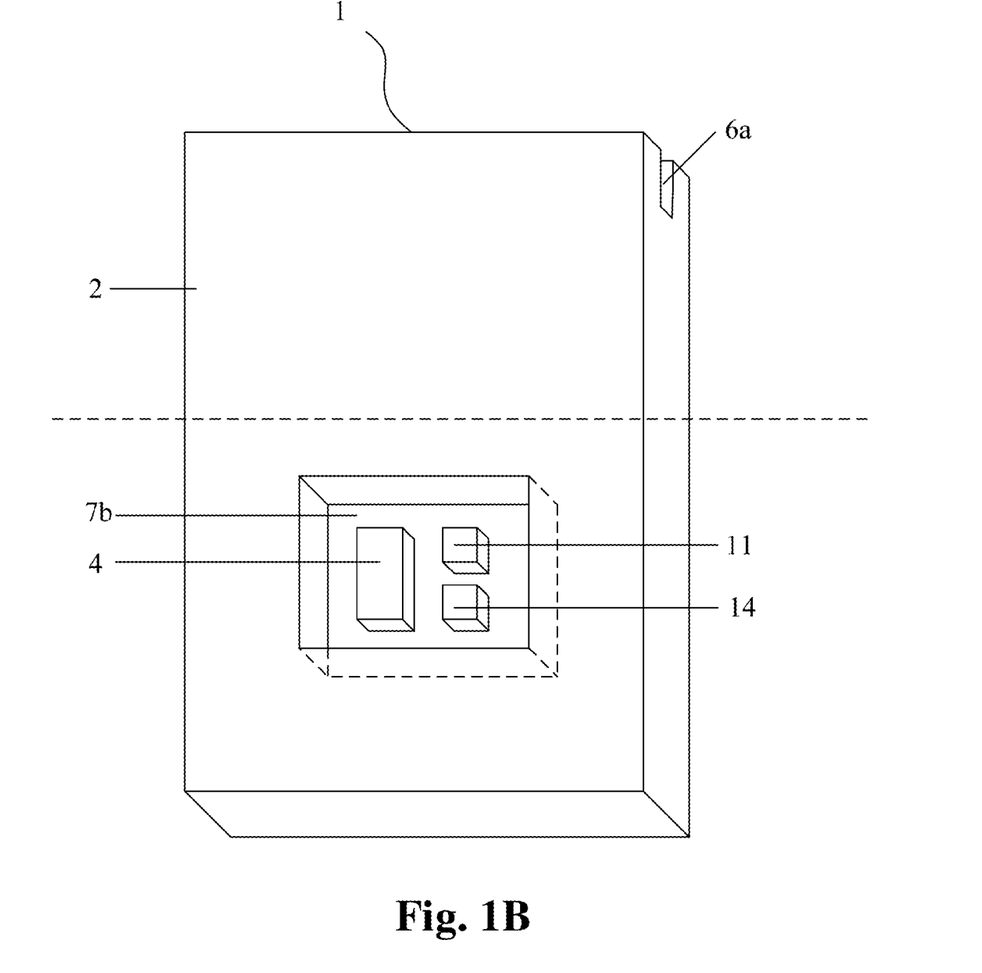
FIG. 1B is the rear structure diagram of the portable e-pay system in accordance with the first embodiment of the present invention.

FIG. 1B shows a portable e-pay system 1 being taken out the battery lid (not shown). A rechargeable battery 4 is shown inside the outer housing. Due to the electrical connection between the rechargeable battery 4 and the power connecting socket 5 (not shown), users can recharge the rechargeable battery 4 to maintain the operation of the portable e-pay system 1.

Furthermore, in the preferred embodiment, the present invention has a pluggable memory module 14, which could be a memory card socket, setting between the outer housing 2 and inner housing 7. The pluggable memory module 14 is set for a corresponding pluggable memory, such as a Secure Digital Memory Card (SD Card) or a micro SD card. The pluggable memory can be installed in the pluggable memory module. In addition, the present invention further contains a wireless communication module 11 located between the outer housing 2 and the inner housing 7. The wireless communication module 11 can be at least one or more than one of a wireless network module, a Global System for Mobile Communications (GSM) Subscriber Identity Module (SIM) and a Wideband Code Division Multiple Access (WCDMA) authentication module. The wireless communication module 11 shown in FIG. 1B is a Global System for Mobile Communications Subscriber Identity Module with a SIM card slot.

Figure 1C:
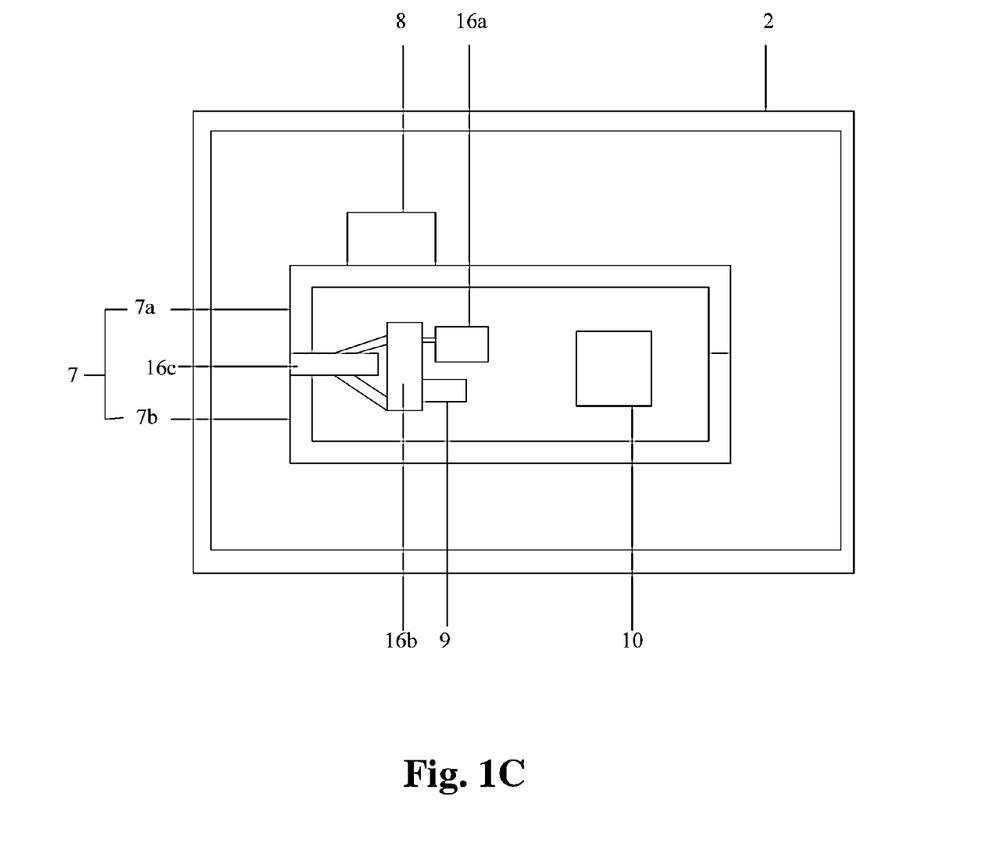
FIG. 1C is the cross-sectional view of the portable e-pay system in accordance with the first embodiment of the present invention.

FIG. 1C shows the cross-sectional diagram in the dotted line of FIGS. 1A and 1B. The outer housing 2 contains an inner housing 7, and the inner housing 7 has a first inner housing 7a and a second inner housing 7b, which are the upper portion and the lower portion of inner housing 7 respectively. A data storage memory 8 is located between the outer housing 2 and the inner housing 7. A tax data memory 9, an inner housing battery 16a and a volatile memory 10 are located between the first inner housing 7a and the second inner housing 7b; that is to say, these elements 9, 16a, 10 are located within the space inside the inner housing 7. The volatile memory 10 is supplied the electric power directly or indirectly by the inner housing battery 16a. In the preferred embodiment, the volatile memory set on the inner housing circuit board 16b, and the inner housing circuit board 16b connects to the inner housing battery 16a; besides, the inner housing circuit board 16b has two connecting points. The two connecting points electrically connected to an inner housing conductor 16c separately. The inner housing conductor 16c is stabilized and fix by the first and the second inner housing 7a, 7b, so that a close electrical loop is formed. Thus, when the first inner housing and the second inner housing separates with each other, the close loop is open, leading the volatile memory 10 not being supplied with electricity. After that, the information stored inside the volatile memory 10 disappears. What is stored in the volatile memory is a taxpayer data, and the taxpayer data includes a taxpayer ID and a taxpayer password provided by the tax authorities.

When the merchants use the portable e-pay system 1 to generate a transaction data, the taxpayer data can be used to combine with the transaction data to generate transaction data with electronic signature, which can be stored into the tax data the memory 9. In a preferred embodiment, the tax data memory 9 is a Write-Once Read-Many (WORM) Flash Memory, so that each memory unit of tax data memory 9 can only be written once. Once written, it can not be deleted or modified.

Accordingly, in the first embodiment, the present invention can be used as a tax control device. The so-called "tax control device" is a kind of technical device what tax authorities designate each enterprise to install, maintain, or use. Tax authorities can monitor the tax reporting through the technical devices having tax control audit function and strict electronic or physical protection mechanisms. As mentioned above, as long as merchants use the present invention to read credit cards, then the present invention will produce an electronic signature and encrypt the transaction data by the taxpayer ID and taxpayer password given by the tax authorities (Taxpayers shall not be able to control and change the pair of taxpayer ID and taxpayer password so as to avoid taxpayers' cracking of the electronic signature or encrypted tax data given by tax authorities. And thus, the taxpayer has no way to hinder the tax control designated by the tax authorities.). Then the present invention will save the transaction data with electronic signature into the tax data memory 9. Because the data stored in the tax data memory 9 can only be written once, and once written, it can never be changed or deleted. Therefore, the tax authorities do not have to worry about the tax data being changed by the taxpayers so that the tax authorities can assure the accuracy of the tax data and audit the merchants anytime by accessing the tax transaction data in tax data memory 9. In addition, as long as the government authorities regulate merchants to install the present invention as a tax control device, when merchants proceed with each transaction by credit cards or similar cards for payment, all transaction data will be recorded correctly. Under such circumstance, the government can obtain detailed tax data from the merchants so as to confirm the accuracy of whatever tax reports filed by merchants.

When the merchants need to file a tax report, they will designate a period of time by law. In the meanwhile, the portable e-pay system 1 will combine the transaction data produced in the period of time into a single file, and use the taxpayer ID and taxpayer password to encrypt and electronically signified. Merchants can read the file and transmits it to the tax authorities via the pluggable memory module 14, or directly transmit the transaction data with electronic signature or transaction data to an external server 12 of the tax authorities via the wireless communication module 11.

Furthermore, the tax data memory 9 and the volatile memory 10 are both located within the inner housing 7. If the merchant attempts to "discover" or "tamper" the data stored in the tax memory 9 and the volatile memory 10 for tax evasion, they inevitably need to break the inner housing 7 and make the first inner housing 7a and second inner housing 7b separate, then the power of the tax data memory 9 will be turned off, so that the taxpayers ID and taxpayer password disappear or is so-called "destroyed". The portable e-pay system can no longer work properly before the tax authorities restore the taxpayer data into the system. Therefore, the taxpayer obviously can not affect the accuracy of tax data without tax authorities' notice.

Figure 2:
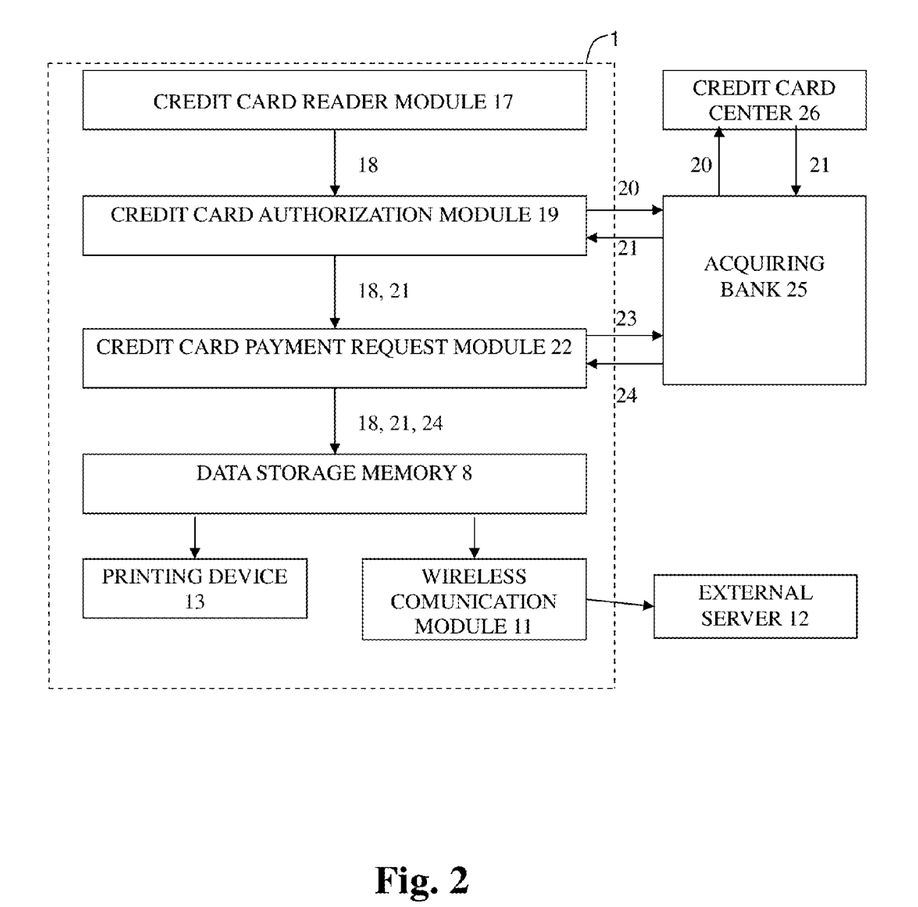
FIG. 2 is the block diagram of the portable e-pay system in accordance with the second embodiment of the present invention.

Please refer to FIG. 2, the FIG. 2 shows the second embodiment of the present invention. The second embodiment is a further application of the first embodiment. The hardware devices used in the second embodiment can refer to that of the first embodiment in FIGS. 1A, 1B and 1C. Please note that the second embodiment is one of the implementing specifically used for the credit card payment system, so the card reading module 6 of the first embodiment is a credit card reader module located on the outer housing 2.

As shown in FIG. 2, the portable e-pay system 1 further comprises a credit card reader module 17 (corresponding to the card reader module 6 as shown in FIG. 1A), a credit card authorization module 19 and a credit card payment request module 22. The credit card reader module 17 can be a magnetic stripe reader module 6a, a chip reader module, an inductive card reader module 6b or a radio frequency identification (RFID) module, and credit card information can be obtained by reading credit card magnetic stripe, credit card chip or other correspondence devices respectively. One or plural credit card reader module 17 can be set on the portable e-pay system 1, so as to provide various ways of payment. Please note that it does not mean that merchants need to use a plurality of card reader modules 17 to process a single payment. When the merchants read the credit card data for transaction, the credit card reader module 17 will transmit a transaction data 18 (may contain the aforementioned credit card data, commodity items, price and total price of the transaction, etc.) to the credit card authorization module 19. In this case, the credit card authorization module 19 may transmit an authorization requesting message 20 to a Credit Card Center 26 (also known as international card organizations, domestic clearing house or authorization switching center) directly or indirectly via the merchants' acquiring bank 25. Once the Credit Card Center 26 obtains an authorization code 21 from the issuing bank (not shown), the authorization code can be sent to the credit card authorization module 19 of the system 1 directly or indirectly via the credit card center and the acquiring bank 25.

Afterwards, credit card authorization module 19 will transmit the transaction data 18 and the authorization code 21 to the credit card payment request module 22. The credit card payment request module can transmit a payment confirming data requesting message 23 to the acquiring bank 25 based on the transaction data 18 and the authorization code 21. Then the acquiring bank can send a payment confirming data 24 back to the credit card payment request module 22. It should be noted that the payment confirming data 24 can be a message that acquiring bank confirms payment to store for a certain transaction, or a code that the acquiring bank 25 use internally, to represent the transaction data 18.

Once the credit card payment request module 22 receives payment confirming data 24 from the acquiring bank, the credit card payment request module 22 may store the transaction data 18, authorization code 21 and payment confirming data 24 into the data storage memory 8, and transmit the transaction data, authorization code or payment confirming data to an external server 12 of merchants; or use the printing device 13 located on the outer housing 2 to print out the transaction data 18, the authorization code 21 or payment confirming 24. In a preferred embodiment, wherein the printing device 13 may print out the transaction data 18, the authorization code 21 and payment confirming 24 on a single document, so that the correlation of them can be set.

Overall, in addition to the transaction data 18 and the authorization code 21, the system 1 further records the payment confirming data 24 provided by the acquiring bank 25 in a single document. Therefore, when the merchants would like to request payment from acquiring banks 25, the merchants only need to provide the document reciting the transaction data 18, the authorization code 21 and the payment confirming data 24 to the acquiring bank 25. Since the payment confirming data 24 are obtained from the acquiring bank, the acquiring bank 25 can check its internal database after receiving the payment confirming data 24 and process payment quickly and immediately if the data is correct. Thus, the merchants reduce the time and labor spent on checking the internal transaction data 18 and the reports provided by the acquiring bank 25 and make sure whether they match each other.

Since the second embodiment is the first embodiment that further comprises a credit card authorization module 16 and a credit card payment request module 19, it is much easier for merchants to handle the reconciliation of credit card payment. Therefore, it provides incentives for merchants to use the present invention. If more merchants decide to use the present invention, tax authorities can confirm more revenue from merchants easily and correctly and thus, achieving the purpose of better tax control.

Figure 3:
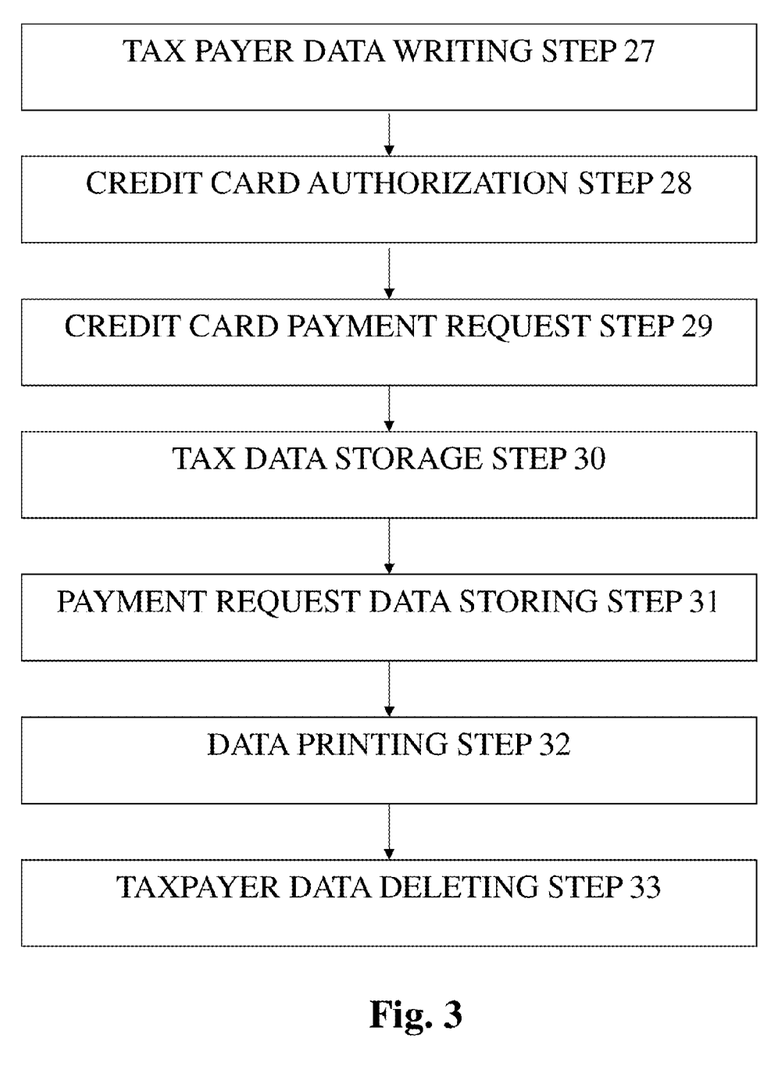
FIG. 3 is the block diagram of the portable e-pay method of the present invention.

Please refer to FIG. 3, this figure shows a portable e-pay method of the present invention. When the merchants install a portable e-pay system 1, the tax authorities can use a taxpayer data writing step 27 to write the taxpayer data into a volatile memory 9 of the portable e-pay system 1, so as to facilitate following activities such as electronic signatures, encrypting transaction data, etc.

Afterwards, the portable e-pay method of the present invention further comprises a credit card authorization step 28. The credit card authorization step 28 can be used to directly or indirectly request an authorization code 21 from a Credit Card Center via the portable e-pay system 1 when a credit card reader module 6 of the portable e-pay system 1 reads and obtains the credit data in a credit card in order to proceed transactions and record a transaction data 18. After that, in a credit card payment request step 29, which indicates that the portable e-pay system 1 can request a payment confirming data 24 from an acquiring bank 25 after the Credit Card Center 26 directly or indirectly transmits the authorization code 21 to the portable e-pay system 1.

Afterwards, the portable e-pay method of the present invention further comprises a tax data storing step 30. The tax data storing step 30 can generate transaction data with electronic signature by encrypting the transaction data 18 with the taxpayer data. The transaction data with electronic signature can be stored in a tax data memory 10. In the preferred embodiment of the present invention, the tax data memory 10 can be a Write-Once Read-Many (WORM) flash memory, thereby it prevents the tax data from being tampered.

The tax data storing step 30 and the payment request data storing step 31 can be done simultaneously or in whatever sequence. When performing the payment request data storing step 31, the portable e-pay system 1 will save the transaction data 18, the authorization code 21 and the payment confirming data 24 into the data storage memory 8 of the portable e-pay system 1. If necessary, a data printing step 32 can be performed. The data printing step 32 is used to print out transaction data 18, authorization code 21 or payment confirming data 24. Finally, if the merchants no longer need the portable e-pay system 1 and would like to abandon the device, or transfer the device and used it in another store, a taxpayer data deleting step 33 can be performed to delete the taxpayer data saved in the volatile memory 9, so as to facilitate proceeding of the taxpayer writing data step 27 to write another taxpayer data.

Figure 4A:
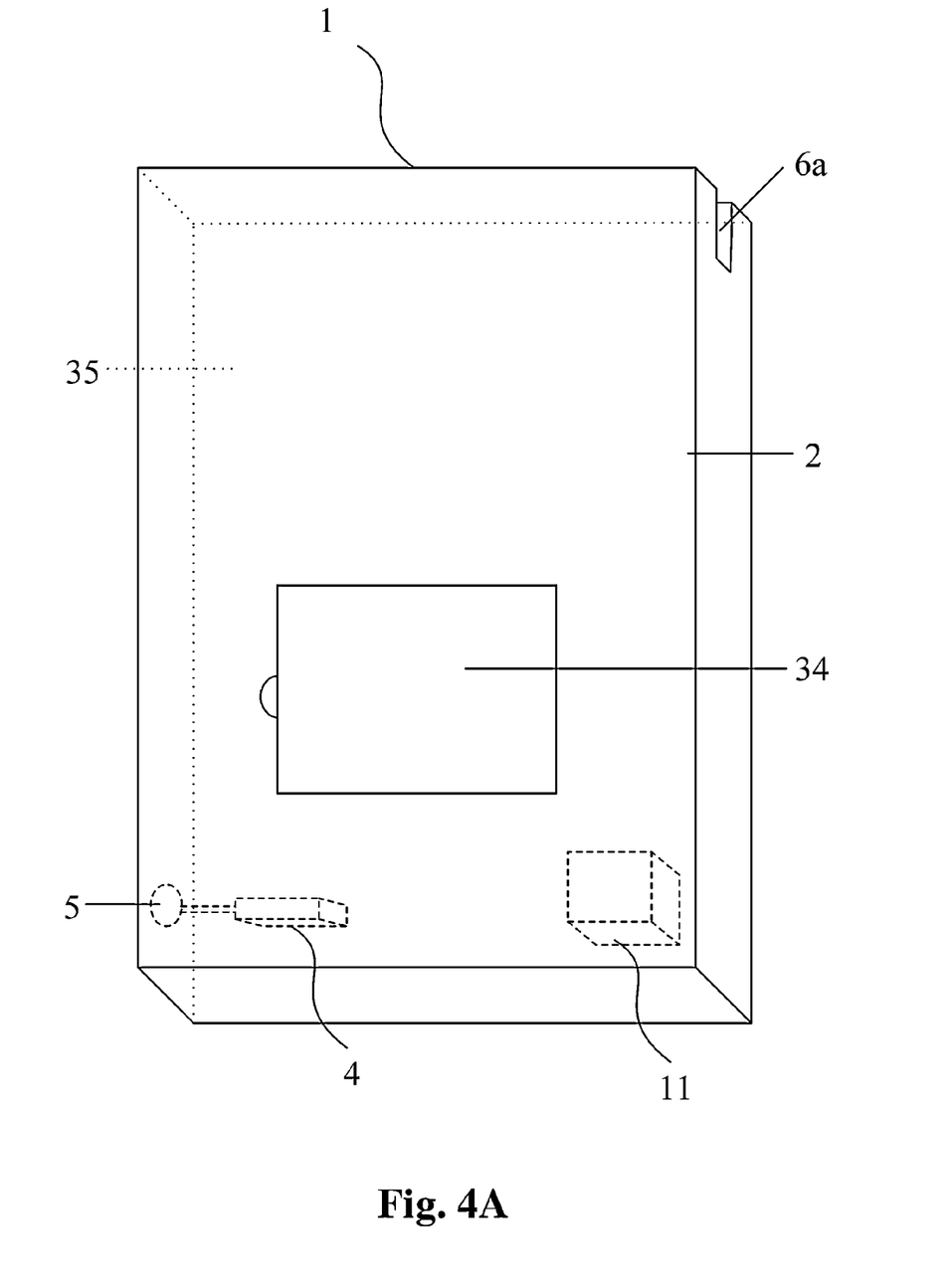
FIG. 4A is the first rear structure diagram of the portable e-pay system in accordance with the third embodiment of the present invention.

The following is the third embodiment of the present invention. The portable e-pay system 1 comprises a card reader module 6 located on the outer housing 2. The card reader module 6 can read a consumer card, and the consumer card can be used to request a payment from an acquiring bank, wherein the consumer card is one of a credit card and a debit card FIG. 4A shows the rear side of the present invention in the third embodiment. The outer housing 2 extends from the front side to the rear side, forming a rectangular hole. The hole can be used to accommodate a lid 34, and the lid 34 can completely fill up the rectangular hole, so that each side of the lid 34 can contact with the outer housing 2, i.e. the lid 34 is surrounded by the outer housing 2. In the preferred embodiment, the lid has a semicircle protruding device, so that user can open up the lid 34 easily.

In addition, since the lid 34 and the outer housing 2 are seamlessly contacted, they can define an inner space 35 within the lid 34 and the outer housing 2. The inner space 35 can be used to implement various elements, such as circuit board and memory. Among the elements is a rechargeable battery 4, which is electrically connected with the power supply socket 5 on the outer housing, so that users can recharge the rechargeable battery 4 to maintain normal operation of the portable e-pay system.

Besides, as in the first embodiment, the portable e-pay system comprises a touch panel 3, a rechargeable battery 4 and a power connecting socket 5, wherein the outer housing 2 surrounds the touch panel 3 and the power connecting socket 5, and the rechargeable battery 4 is located within the inner space 35.

Two characteristics of the present invention are designed to enhance its portability and mobility. First of all, the rechargeable battery 4 is implemented in the system 1, users don't need to fix the system 1 to a power transmission line all the time. Instead, the system 1 can be carried with users when they move around. Second, the system 1 is implemented a wireless communication module 11, which is located within the inner space 35 or on the surface of the outer housing 2, so that data transmission can be done from anywhere, and transmits the transaction data with electronic signature. Unlike the present invention, the POS in the prior art is fixed constantly so that it can only transmit data to an external server through a physical transmission line, or link to the Internet through a transmission line. With the two characteristics mentioned above, the present invention is very convenient to use, and the location where it can be used would be very flexible. Salesmen can even carry the present invention to streets to make transaction.

Figure 4B:
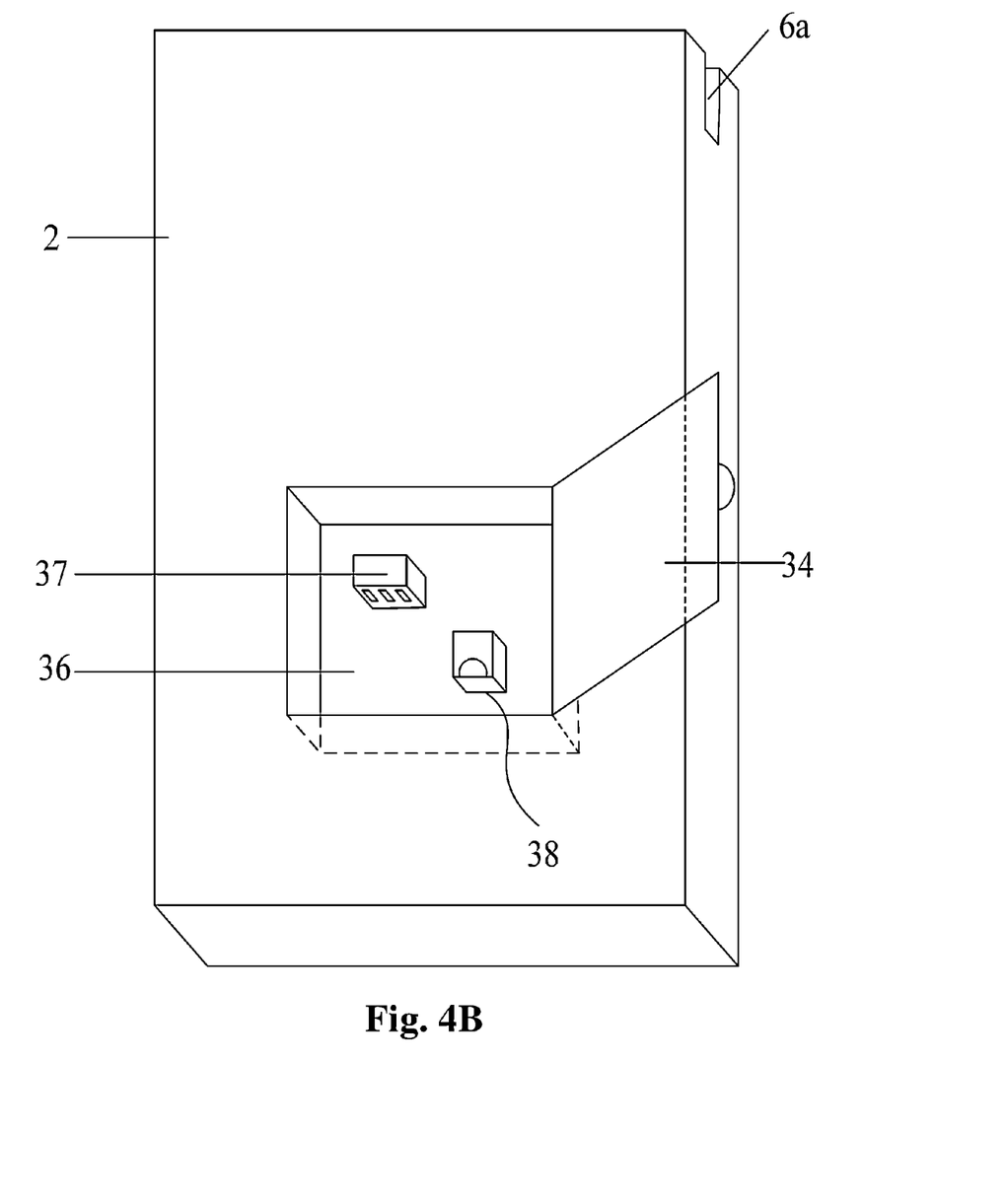
FIG. 4B is the second rear structure diagram of the portable e-pay system in accordance with the third embodiment of the present invention.

FIG. 4B shows the present invention where the lid is opened. A tax element accommodation space 36 is shown in the figure. The tax element accommodation space 36 is part of the inner space 35. For convenience of operation, the tax element accommodation space 36 could be physically isolated from the rest of the inner space 35, so that the tax element accommodation space 36 can be used for tax-related elements only. When the lid 34 is closed, which means each side of the lid 34 is connected to the outer housing 2, the tax element accommodation 36 is adjacent to the lid 34. That is to say, after users open the lid, they can access the tax element accommodation space 36, and when the lid 34 is connected with outer housing, users are denied to access the tax element accommodation space 36.

A tax data controller connecting device 37 and a tax data memory connecting device 38 are implemented in the tax element accommodation space 36. The tax data controller connecting device 37 in FIG. 2B is a connector with 3 pins, but it is not limited to that; similarly, the tax data memory connecting device 38 in FIG. 2B is a memory card socket, but it is not limited to that, either. In addition, the tea data controller connecting device 37 is used to electrically connect with a tax data controller, and the tax data memory connecting device 38 is used to electrically connect with a tax data memory. The tax data controller stores a taxpayer data, such as a taxpayer ID, a taxpayer number, or/and a taxpayer password, etc. The taxpayer data can be used to represent the identity of the taxpayer, or be used to verify the taxpayer.

In the preferred embodiment, the tax data memory could be a Write-Once Read Many (WORM) Flash Memory. What's more, the tax data controller and the tax data memory are both pluggable. Hence, before plugging in the tax data controller and the tax data memory, the portable e-pay system 1 can be used as a normal POS without tax control function, but once the owner of the present invention wants to activate the tax control function due to the actual necessity or regulation requirement, the owner can go to a specific location and have his taxpayer data written into the tax data controller. After that, he needs to have the tax data controller and the tax data memory connected with the tax data controller connecting device 37 and tax data memory connecting device 38 respectively.

In addition, the tax data controller and the tax data memory can be replaced by a tax data module, and the tax data controller connecting device 37 and the tax data memory connecting device 38 can be replaced by a tax data module connecting device. The tax data module connecting device can be a connector with 5 pins, but not limited to it. The pins of the connecting device should be adjusted to the connecting method and user's need. At this time, as long as the tax data module is implemented in the tax element accommodation space 36 and is electrically connected with the tax data module connecting device, the tax data module can be used to perform all tax control function provided by the present invention.

As the portable e-pay system generates a transaction data with the card reader module 6 and the touch panel 3, the taxpayer data can be used to generate transaction data with electronic signature by encrypting the transaction data. The transaction data with electronic signature can be stored in the tax data memory. Besides, the transaction data with electronic signature or the transaction data can be transmitted to an external server 12, so that merchants can use the system 1 to calculate their revenues and fulfill their obligations to file reports on their liable taxation.

In the preferred embodiment, the wireless communication module 11 can transmit the transaction data with electronic signature to an external server 12 real-time after each transaction data with electronic signature is generated. That is to say, after each transaction data with electronic signature is generated, as soon as the wireless communication module 11 is under normal operation or connects to the Internet, the wireless communication module 11 will transmits the transaction data with electronic signature to an external server. If the wireless communication module 11 cannot work at that time, it can transmit every transaction data with electronic signature which has not yet been transmitted to an external server under the taxation authority's control. Consequently, the taxation authority can audit every transaction data of every merchant, so that the necessity of tax audit can be accomplished with the data stored in the external server without sending an official to every store. In addition, since complete transaction data of every store is saved in the external server, the taxation authority can calculate each transaction item and amount, or compare the store's historical data. In the end, stores with unreasonable transaction data will be spotted, so that further examination can be arranged, and complete tax revenues of the country can be assured.

Figure 4C:
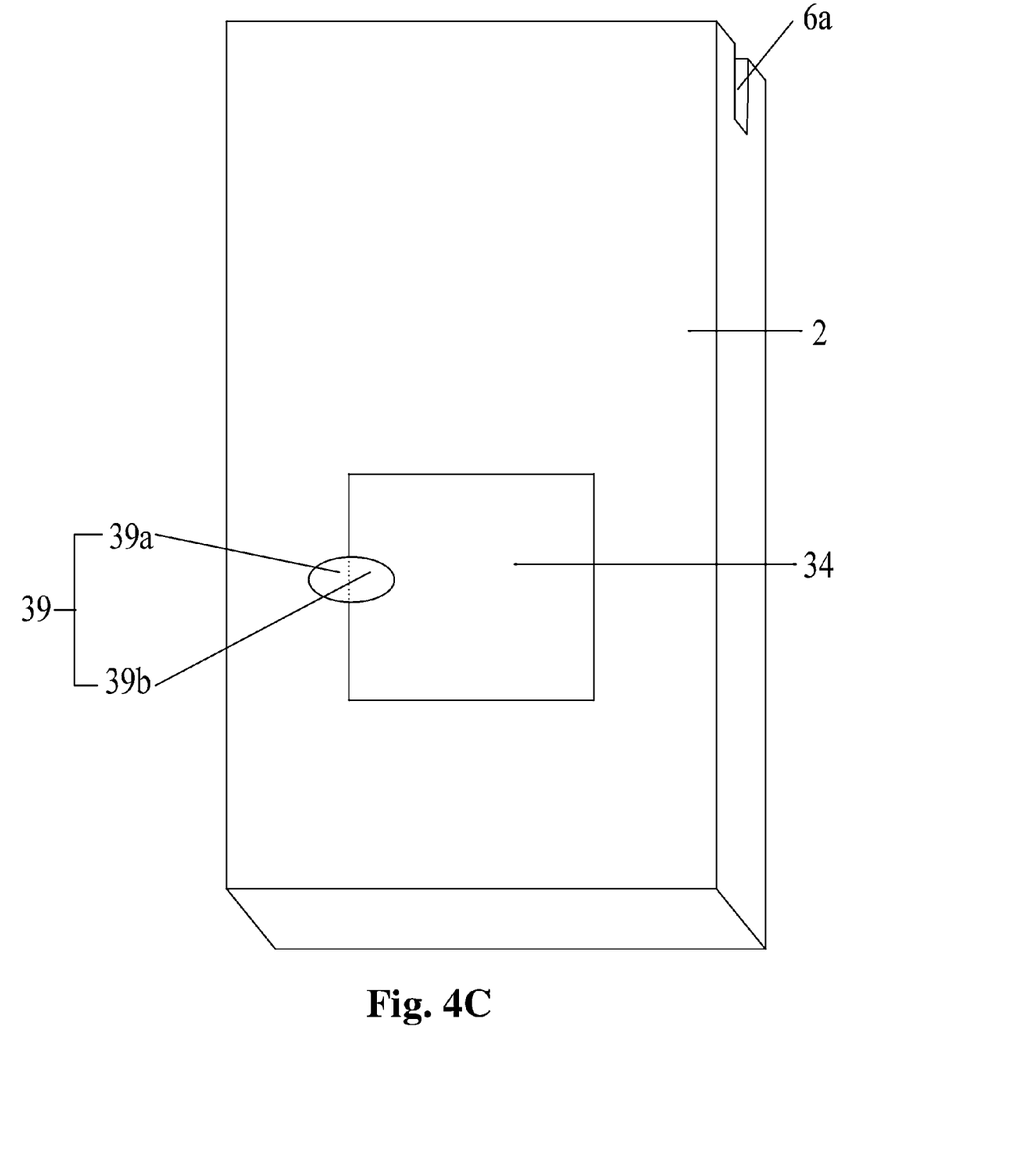
FIG. 4C is the third rear structure diagram of the portable e-pay system in accordance with the third embodiment of the present invention.

FIG. 4C shows a sealing device 39, which is set where the lid 34 and the outer housing 2 connect and is located on the opposite side of the tax element accommodation space 36. That is to say, the sealing device 39 is on the outer side of the lid 34, or the down side of the outer surface of the portable e-pay system. The sealing device 39 has a first sealing device 39a and a second sealing device 39b, which are consecutive and inseparable. Usually, the first sealing device 39a and the second sealing device 39b are in one-piece formation. The first sealing device 395a is established on the outer housing 2, and the second sealing device 39b is established on the lid 34. That is, the sealing device 39 crosses the outer housing 2 and the lid 34. Once the outer housing 2 and the lid 34 separate, the sealing device is destroyed irrecoverably. Therefore, after the sealing device is set, it can be used to assure that the lid 34 cannot be opened without others' notice. The sealing device can be a lead seal device, a piece of paper sticker, a tin-plate. In the best mode, the portable e-pay system can use a lead seal device as the sealing device 39.

Normally, merchants would definitely destroy the lead seal device as well as the identity drawings or character if merchants want to open the lid seal device. The kind of innovative lead device serves better function of confidentiality, so that the portable e-pay system 1 can be prevented from stealing, and the system 1 is easily-made and convenient to operate; also, we can lower the cost of the lead sealing device. With the design of the sealing device, after merchants insert the tax data controller and the tax data memory into the system 1 and seals the outer housing 2 and the lid 34, the tax control function of the system 1 is activated. Thereafter, opening the lid 34 and tampering the transaction data with electronic signature without the authorization of the taxation authority would be prevented.

In combination of all structures of the present invention mentioned above, the present invention can be a portable e-pay system with mobility as well as tax control function.

Figure 5:
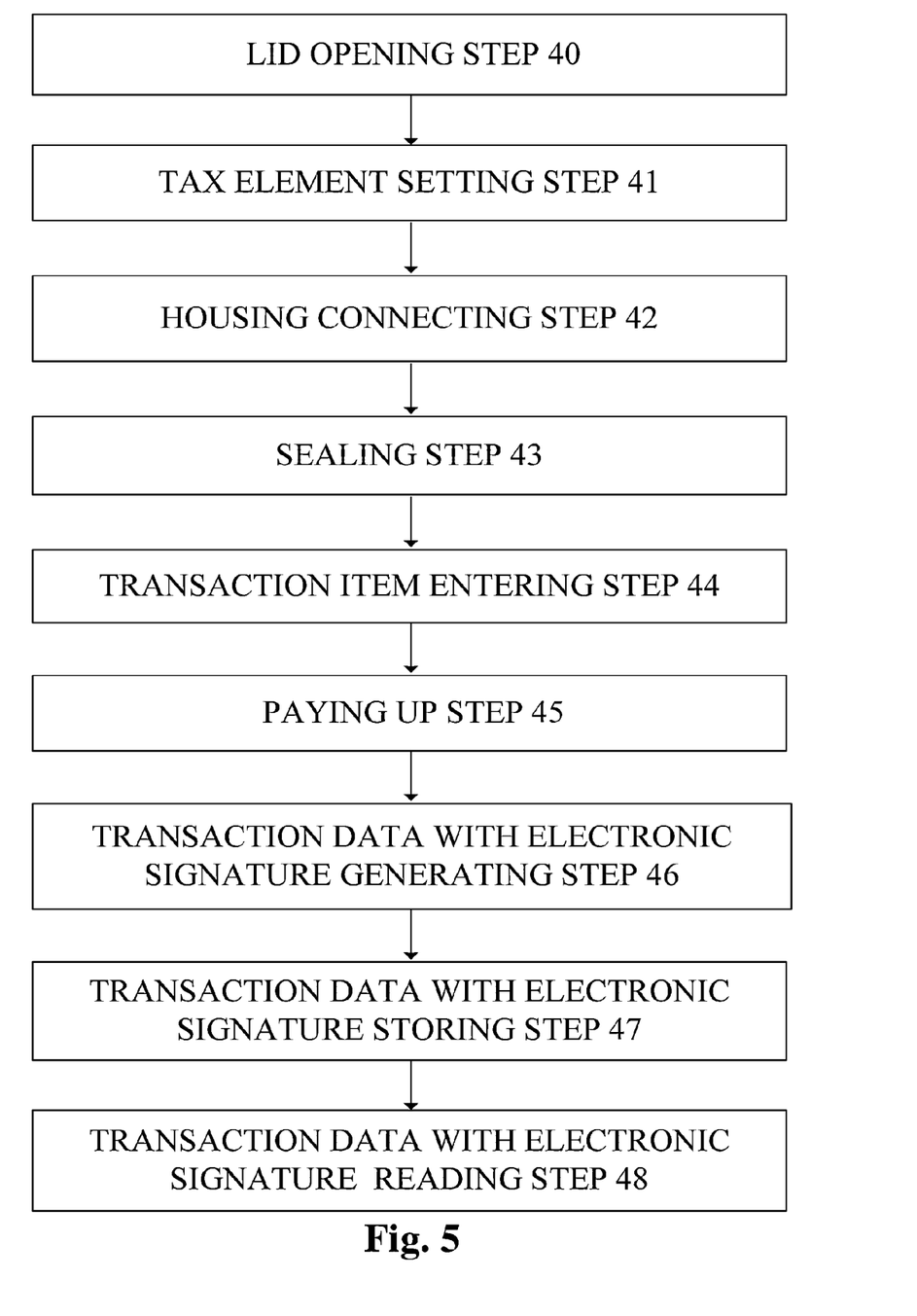
FIG. 5 is the block diagram of the portable e-pay method of the present invention.

FIG. 5 shows a portable e-pay method. When users want to activate the tax control function, a lid opening step 40 should be implemented first, wherein the lid 34 is separated from the outer housing 2. At the same time, a tax element accommodation space 36 is exposed. A tax data module connecting device is established in the tax element accommodation space 36. After that, a tax element setting step 41 requires a tax data module and a tax data module connecting device being electronically connected, wherein the tax data module contains a tax data controller and a tax data memory. The following is a housing connecting step 42, wherein the lid 34 and the outer housing 2 connect to each other again. After that, a sealing step 43, wherein at least one of the sides where the lid 34 and the outer housing connect is sealed.

Then, the present invention provides a transaction item entering step 44, wherein a user enters one or plural transaction items via the touch panel 3 or the barcode reader module 15. The following is a paying up step 45, wherein a card reader module 6 reads a consumer credit information to pay up the one or plural transaction items and generates a transaction data. After that, transaction data with electronic signature generating step 46 is proceeded, wherein the tax data controller generates the transaction data with electronic signature based on the previous taxpayer data, and thus generating a transaction data with electronic signature. In the end, there is a transaction data with electronic signature storing step 47, wherein the transaction data with electronic signature is stored in the tax data memory of the tax data module.

Whenever a tax reporting necessity shows, the present invention provides a transaction data with electronic signature reading step 48, wherein the transaction data with electronic signature is read from the tax data memory, and is transmitted to an external server 12 through a wireless communication module 11. The timing of reading and transmitting could be right after each transaction data with electronic signature is generated, which means transmitting the transaction data with electronic signature to an external server 12 real-time with the wireless communication module 11. Needless to say, the "real-time" here is on the basis that the wireless communication module 11 can operates normally and in order, and the internet is accessible. If the wireless communication module 11 is out of order temporarily, or the internet is not accessible right away, then all the transaction data with electronic signature can be retained or accumulated till the wireless communication module 11 is in order and the internet is accessible. At that time, all of the remaining transaction data with electronic signature can be transmitted. On the other hand, in another embodiment, the portable e-pay method can let users enter a transaction data with electronic signature reading order (such as pressing the transmitting button on the touch panel 2), or it can have the system 1 generate transaction data with electronic signature reading order periodically based on the tax law. Thus, the portable e-pay method can provides a transaction data with electronic signature reading step, wherein the system transfers the transaction data with electronic signature to an external server 12 after accepting transaction data with electronic signature reading order.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A portable e-pay system, the system comprising an outer housing, a touch panel, a rechargeable battery and a power connecting socket, wherein the touch panel and the power connecting socket are located on the surface of the outer housing, the rechargeable battery is located within the outer housing, and the rechargeable battery and the power connecting socket are electrical connected, the portable e-pay system further comprises:
   a card reader module located on the outer housing;
   an inner housing, having a first inner housing and a second inner housing, the first inner housing and the second inner housing enclosing an accommodation space, wherein the inner housing located within the outer housing and an inner housing conductor is stabilized and fixed by the first inner housing and the second inner housing;
   a data storage memory located within the outer housing;
   a tax data memory, a volatile memory and an inner housing battery located within the accommodation space, wherein the inner housing battery and the volatile memory are electrically connected by the inner housing conductor and thus, the volatile memory is supplied the electric power by the inner housing battery via the inner housing conductor;
   a taxpayer data storing in the volatile memory, wherein when the portable e-pay system generates a transaction data, the taxpayer data can be used to combine with the transaction data to generate transaction data with electronic signature, and the transaction data with electronic signature is stored in the tax data memory; and
   a wireless communication module located within the outer housing, for transmitting the transaction data with electronic signature or the transaction data to an external server;
   wherein when the first inner housing separates with the second inner housing, the electrical connection between the inner housing battery and the volatile memory is broken, leading the volatile memory not being supplied with electric power, so that the taxpayer data stored in the volatile memory is destroyed.

2. The portable e-pay system of claim 1, wherein the tax data memory is a flash memory, and each memory unit of the tax data memory can only be written once.

3. The portable e-pay system of claim 1, wherein the system further comprises a printing device and a barcode reading module, both located on the outer housing.

4. The portable e-pay system of claim 1, wherein the system further comprises a pluggable memory module which is located between the outer housing and the inner housing for installing a pluggable memory.

5. The portable e-pay system of claim 1, wherein the taxpayer data comprises a taxpayer ID and a taxpayer password.

6. A portable e-pay system, the system comprising an outer housing, a touch panel, a rechargeable battery and a power connecting socket, wherein the touch panel and the power connecting socket are located on the surface of the outer housing, the rechargeable battery is located within the outer housing, and the rechargeable battery and the power connecting socket are electrical connected, the portable e-pay system further comprises:
   a credit card reader module located on the outer housing;
   a data storage memory located within the outer housing;
   a credit card authorization module, wherein the credit card authorization module can be used to directly or indirectly request an authorization code from a Credit Card Center when the credit card reader module generates a transaction data;
   a credit card payment request module, wherein the credit card payment request module can be used to request a payment confirming data from an acquiring bank, and the credit card payment request module can save the transaction data and the payment confirming data in a data storage memory after the credit card authorization module receives the authorization code;
   a wireless communication module located within the outer housing, for transmitting the transaction data, the authorization code or the payment confirming data to an external server; and a printing device located on the outer housing, for printing the transaction data, the authorization code or the payment confirming data.

7. The portable e-pay system of claim 6, wherein the printing device prints out the transaction data, the authorization code and the payment confirming data on a single document.

8. The portable e-pay system of claim 6, the system further comprises a pluggable memory module located within the outer housing, wherein the pluggable memory module is used to be connected with a pluggable memory.

9. A portable e-pay system, the system comprising an outer housing, a touch panel, a rechargeable battery and a power connecting socket, wherein the touch panel and the power connecting socket are located on a surface of the outer housing, the rechargeable battery is located within the outer housing, and the rechargeable battery and the power connecting socket are electrical connected, the portable e-pay system further comprises:
   a credit card reader module and a printing device located on the outer housing;
   a data storage memory, a tax data memory and a volatile memory, located within the outer housing;
   a taxpayer data storing in the volatile memory, wherein the portable e-pay system generates a transaction data before the taxpayer data can be used to encrypt the transaction data in order to generate transaction data with electronic signature, wherein the transaction data with electronic signature is stored in the tax data memory;
   a credit card payment authorization module, wherein the credit card authorization module can be used to directly or indirectly request an authorization code from a Credit Card Center when the credit card reader module generates a transaction data;
   a credit card payment request module, wherein the credit card payment request module can be used to request a payment confirming data from an acquiring bank when the credit card authorization module receives the authorization code, and the credit card payment request module can save the transaction data and the payment confirming data into the data storage memory;
   a wireless communication module located within the outer housing, for transmitting the transaction data, the authorization code, the payment confirming data or the transaction data with electronic signature; and a printing device located on the outer housing, for printing out the transaction data, the authorization code or the payment confirming data.

10. The portable e-pay system of claim 9, wherein the system further comprises an inner housing, having a first inner housing and a second inner housing located within the outer housing, wherein the first inner housing and the second inner housing are electrically connected when the first inner housing connects with the second inner housing, and the tax data memory and the volatile memory are located within the inner housing and the taxpayer data is destroyed when separating the first inner housing and the second inner housing apart.

11. The portable e-pay system of claim 9, wherein the tax data memory is a flash memory, and each memory unit of the tax memory can only be written once.

12. The portable e-pay system of claim 9, the system further comprises a pluggable memory module located between the outer housing and the inner housing, wherein the pluggable memory module is used to be connected with a pluggable memory.

13. The portable e-pay system of claim 9, wherein the taxpayer data comprises a taxpayer ID and a taxpayer password, the taxpayer data can be used to encrypt the transaction data.

14. A portable e-pay method, the method comprising:
a taxpayer data writing step, wherein a tax payer data is written into a volatile memory of a portable e-pay system;
a credit card authorization step, directly or indirectly requesting an authorization code from a Credit Card Center when a credit card reader module of the portable e-pay system obtains a credit data to proceed a transaction and record a transaction data;
a credit card payment request step, requesting a payment confirming data from an acquiring bank after the portable e-pay system directly or indirectly receives the authorization code from the Credit Card Center;
a tax data storing step, encrypting the transaction data with the taxpayer data in order to generate transaction data with electronic signature, and the transaction data with electronic signature is stored in a tax data memory;
a payment request data storing step, saving the transaction data, the authorization code and the payment confirming data into a data storage memory of the portable e-pay system; and
a data printing step, printing out the transaction data, the authorization code or the payment confirming data.

15. The portable e-pay method of claim 14, the method further comprises a taxpayer data deleting step, which deletes the taxpayer data from the volatile memory.

16. A portable e-pay system, comprising:
an outer housing and a lid, wherein the outer housing surrounds the lid, and the outer housing as well as the lid confines an inner space;
a touch panel, a rechargeable battery and a power connecting socket, wherein the outer housing surrounds the touch panel and the power connecting socket, and the rechargeable battery is located within the inner space, and the rechargeable battery and the power connecting socket are electrically connected;
a card reader module located on the outer housing;
a tax element accommodation space is part of the inner space, and the tax element accommodation space is adjacent to the lid;
a tax data module connecting device located in the tax element accommodation space, wherein the tax data module connecting device is used for connecting a pluggable tax data module;
a sealing device comprising a first sealing device and a second sealing device, and the first sealing device and the second sealing device being consecutive, wherein the first sealing device is located on the outer housing and the second sealing device is located on the lid, wherein after the sealing device is established, once the outer housing and the lid separates, the sealing device is destroyed irrecoverable; and
a wireless communication module, located within the inner space or on the surface of the outer housing;
wherein the tax data module stores a taxpayer data;
wherein the portable e-pay system is used to generate a transaction data with the card reader module and the touch panel, the transaction data can be encrypted by the taxpayer data, generating transaction data with electronic signature;
wherein the transaction data with electronic signature is stored in the tax data module, and the wireless communication module can transmit the transaction data with electronic signature or the transaction data to an external server.

17. The portable e-pay system of claim 16, wherein the tax data module connecting device and the tax data module are electrically connected, and the tax data module connecting device and the tax data module are both located in the tax element accommodation space.

18. The portable e-pay system of claim 17, wherein the tax data module connecting device comprises a tax data controller connecting device and a tax data memory connecting device, and the tax data module comprises a tax data controller and a tax data memory, wherein the tax data controller connecting device and the tax data controller are electrically connected, and the tax data memory connecting device and the tax data memory are electrically connected.

19. The portable e-pay system of claim 16, wherein the card reader module can read a consumer card, and the consumer card can be used to request a payment from an acquiring bank, wherein the consumer card is one of a credit card and a debit card.

20. The portable e-pay method of claim 16, wherein the wireless communication module transmits the transaction data with electronic signature to the external server real-time after each of the transaction data with electronic signature is generated.

21. A portable e-pay method, the method comprising:
a lid opening step, wherein a lid is separated from an outer housing;
a tax element setting step, wherein a tax data module is connected with a tax data module connecting device;
an outer housing connecting step, wherein the outer housing connects with the lid again;
a sealing step, wherein one of the sides where the outer housing connect with the lid is sealed;
a transaction item entering step, wherein one or plural transaction items are entered;
a paying up step, wherein a card reader module reads a consumer credit information to pay up the one or plural transaction items and generates a transaction data;
a transaction data with electronic signature generating step, wherein the tax data module electrically signifies the transaction data, generating transaction data with electronic signature;

a transaction data with electronic signature storing step, wherein the transaction data with electronic signature is stored in the tax data module; and a transaction data with electronic signature reading step, wherein the transaction data with electronic signature is read from the tax data module, and is transmitted to an external server through a wireless communication module.

22. The portable e-pay method of claim 21, wherein the transaction data with electronic signature reading step is to transmit the transaction data with electronic signature to an external server real-time after the transaction data with electronic signature is generated.

23. The portable e-pay method of claim 21, wherein the transaction data with electronic signature reading step is to transmit the transaction data with electronic signature to an external server after accepting a transaction data with electronic signature reading order.

* * * * *